US 6,357,003 B1

(12) United States Patent
Zarrin et al.

(10) Patent No.: US 6,357,003 B1
(45) Date of Patent: *Mar. 12, 2002

(54) ADVANCED FIRMWARE BOOT SEQUENCE X86 COMPUTER SYSTEM THAT MAINTAINS LEGACY HARDWARE AND SOFTWARE COMPATIBILITY

(75) Inventors: Saeed S. Zarrin, Sunnyvale; John Sully, Santa Cruz; Daniel Brown, Newark, all of CA (US)

(73) Assignee: Silicon Graphics, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/176,694

(22) Filed: Oct. 21, 1998

(51) Int. Cl.⁷ .............................................. G06F 15/177
(52) U.S. Cl. .............................. 713/2; 709/301; 710/10
(58) Field of Search ......................... 713/2, 1; 710/10; 709/301, 302; 703/23, 24, 25, 27

(56) References Cited

U.S. PATENT DOCUMENTS

| | | | | | |
|---|---|---|---|---|---|
| 5,590,377 A | * | 12/1996 | Smith | ........................... | 710/22 |
| 5,619,665 A | * | 4/1997 | Emma | ........................... | 712/208 |
| 5,655,148 A | * | 8/1997 | Richman et al. | ............... | 710/8 |
| 5,673,400 A | * | 9/1997 | Kenny | ........................... | 710/129 |
| 5,685,012 A | * | 11/1997 | Klein | ........................... | 710/14 |
| 5,778,242 A | * | 7/1998 | Wang | ........................... | 712/4 |
| 5,793,979 A | * | 8/1998 | Lichtman et al. | ............ | 709/226 |
| 5,802,350 A | * | 9/1998 | Franz et al. | ..................... | 703/1 |
| 5,809,329 A | * | 9/1998 | Richman et al. | ............... | 710/8 |
| 5,809,338 A | * | 9/1998 | Klein | ........................... | 710/35 |
| 5,819,107 A | * | 10/1998 | Lichtman et al. | .............. | 710/8 |
| 5,826,089 A | * | 10/1998 | Ireton | ............................ | 717/7 |
| 5,857,085 A | * | 1/1999 | Zhang et al. | ................ | 710/129 |
| 5,881,294 A | * | 3/1999 | Downey et al. | ............. | 710/260 |
| 5,909,560 A | * | 6/1999 | Kenny et al. | ................ | 710/129 |
| 5,918,048 A | * | 6/1999 | Mealey et al. | .................. | 713/2 |
| 5,933,652 A | * | 8/1999 | Chen et al. | ..................... | 710/1 |
| 5,964,853 A | * | 10/1999 | Falik et al. | .................... | 710/73 |
| 5,974,492 A | * | 10/1999 | Gulick | ......................... | 710/107 |
| 6,003,097 A | * | 12/1999 | Richman et al. | ............... | 710/8 |
| 6,031,993 A | * | 2/2000 | Andrews et al. | ............ | 395/707 |
| 6,032,213 A | * | 2/2000 | Gulick | ......................... | 710/129 |
| 6,041,402 A | * | 3/2000 | Canon et al. | ............... | 712/200 |
| 6,128,731 A | * | 10/2000 | Zarrin et al. | .................... | 713/1 |

* cited by examiner

*Primary Examiner*—Thomas Black
*Assistant Examiner*—Mary Wang
(74) *Attorney, Agent, or Firm*—Wagner, Murabito & Hao LLP

(57) ABSTRACT

An x86 based computer system that implements an advanced firmware based boot process without a conventional x86 BIOS. The computer system includes an x86 processor coupled to a volatile memory and a non-volatile memory via a bus, wherein the non-volatile memory includes an advanced firmware. The advanced firmware is executed by the processor to implement a boot sequence. During the boot sequence, the computer system initializes device drivers using the advanced firmware and interfaces with advanced firmware compliant program with the device drivers of the computer system. The computer system also initializes a virtual compatibility machine for supporting legacy software programs. The virtual compatibility machine includes a plurality of compatibility models. The compatibility models function by interfacing with legacy software programs and by translating functions received from the legacy software programs via the compatibility models into corresponding functions performed by the device drivers of the computer system, thus allowing the computer system to run both legacy software programs and advanced firmware compliant software programs natively.

18 Claims, 10 Drawing Sheets

700

INTERRUPT USAGE SYNOPSIS

| | |
|---|---|
| Interrupt 2 | " NMI (parity, video ticks, etc)" |
| Interrupt 5 | Print screen (status at 50:0h) |
| Interrupt 10h | " Video display ah=functn xxh" |
| Interrupt 10h | " ah=00h    set display mode in al" |
| Interrupt 10h | " ah=02h    set cursor location in dx" |
| Interrupt 10h | " ah=03h    get cursor loc in dx, mode cx" |
| Interrupt 10h | " ah=06h    scroll up, al=lines" |
| Interrupt 10h | " ah=08h    get char al & attrib ah @curs" |
| Interrupt 10h | " ah=09h    set char al & attrib bl @curs" |
| Interrupt 10h | " ah=0Eh    write char al, teletype mode" |
| Interrupt 10h | " ah=0Fh    get state, al=mode, bh=page" |
| Interrupt 11h | Put equipment bits in ax |
| Interrupt 12h | Put (memory size)/1K in ax |
| Interrupt 13h | Disk dl=drive # ah=func xxh |
| Interrupt 13h | " ah=00h    reset disk, al=return status" |
| Interrupt 13h | " ah=02h    read sectors to memory es:bx" |
| Interrupt 13h | " ah=04h    verify sectors with mem es:bx" |
| Interrupt 13h | " ah=09h    initialize drive parameters" |
| Interrupt 13h | " ah=11h    recalibrate drive |
| Interrupt 13h | " ah=14h    controller internal diagnostic" |
| Interrupt 15h | "General     services, ah=func xxh" |
| Interrupt 15h | " ah=4Fh    keybd intercept, al=scan code" |
| Interrupt 15h | " ah=85h    SysReq key, al=0 make, =1 brk" |
| Interrupt 15h | " ah=86h    wait cx:dx microseconds" |
| Interrupt 15h | " ah=88h    get extended mem size/1Kb=ax" |
| Interrupt 15h | " ah=90h    device busy, al=type" |
| Interrupt 15h | " ah=91h    interrupt complete, al=type" |
| Interrupt 16h | Keyboard i/o   ah=function xxh |
| Interrupt 16h | " ah=00h    get keybd char in al, ah=scan" |
| Interrupt 16h | " ah=01h    get status, if zf=0 al=char" |
| Interrupt 17h | " Printer     dx=prn#, ah=func xxh" |
| Interrupt 17h | " ah=00h    print char al, get status ah" |
| Interrupt 17h | " ah=02h    read status, ah=return status" |
| Interrupt 18h | ROM basic |
| Interrupt 19h | Bootstrap loader |
| Interrupt 1Bh | Keyboard break (cntrl-break) |
| Interrupt 1Ch | Timer break (call each 18.2ms) |
| Interrupt 4Ah | RTC Alarm occurred |

I/O PORT USAGE SYNOPSIS   port 0 through port 81h

| Port | Description |
|---|---|
| Port 0 | DMA-1 bas&add ch 0 |
| Port 2 | DMA-1 bas&add ch 1 |
| Port 4 | DMA-1 bas&add ch 2 |
| Port 5 | DMA-1 bas&cnt ch 2 |
| Port 6 | DMA-1 bas&add ch3 |
| Port 7 | DMA-1 bas&cnt ch3 |
| Port 0Ah | "DMA-1 mask     reg bit" |
| Port 0Bh | "DMA-1 mode     reg" |
| Port 0Ch | "DMA-1 clr byte ptr" |
| Port 20h | "8259-1 int     command" |
| Port 20h | "al = 20h,    end of interrupt |
| Port 21h | "8259-1 int     IMR" |
| Port 21h | "8259-1 int     comands" |
| Port 21h | "al = 0FEh, IRQ0 (timer) only" |
| Port 40h | "8253 timer     0 clock" |
| Port 42h | "8253 timer     2 spkr" |
| Port 43h | "8253 timer     control" |
| Port 43h | "al = 0, latch timer0 count" |
| Port 43h | "al = 80h,    latch timer2 count" |
| Port 60h | "keybd scan     or sw 1" |
| Port 60h | "keybd data     write" |
| Port 61h | "8255 port B, read" |
| Port 61h | "8255 B - spkr, etc" |
| Port 61h | "al = 0, speaker off" |
| Port 61h | "al = 0Ch,    enable parity" |
| Port 61h | "al = 0CCh, clear kybd, clk hi" |
| Port 64h | "keyboard status" |
| Port 64h | "kybd cntrlr functn" |
| Port 64h | "al = 60h,    write command byte" |
| Port 64h | "al = 0AAh, self test" |
| Port 64h | "al = 0ADh, disable keyboard" |
| Port 64h | "al = 0C0h, read 8042 in port" |
| Port 64h | "al = 0D1h, wrt 8042 out port" |
| Port 70h | "CMOS addr, bit7 = NMI" |
| Port 70h | "al = 0Ah,    status register A" |
| Port 70h | "al = 0Bh,    status register B" |
| Port 70h | "al = 0Dh,    status register D" |
| Port 70h | "al = 0Eh,    test results reg" |
| Port 70h | "al = 0Fh,    shutdown status" |
| Port 70h | "al = 10h,    floppy drive type" |
| Port 70h | "al = 2Eh,    checksum, hi byte" |
| Port 70h | "al = 2Fh,    checksum low byte" |
| Port 71h | "CMOS data" |
| Port 80h | "POST checkpoint" |
| Port 81h | "DMA page reg ch 2" |

Figure 8A

802
I/O PORT USAGE SYNOPSIS  port 0A0h through port 3FCh
- Port 0A0h          "8259-2 int    command"
- Port 0A0h          "al = 20h,    end of interrupt"
- Port 0A1h          "8259-2 int    IMR"
- Port 0A1h          "8259-2 int    comands"
- Port 0A1h          "al = 2, inhibit IRQ9"
- Port 0A1h          "al = 0FEh, enbl only IRQ8 RTC"
- Port 0A1h          "al = 0FFh, inhibit interrupts"
- Port 0C0h          DMA-2 bas&add ch 0
- Port 0F0h          80287 clear busy
- Port 0F1h          80287 reset
- Port 1F1h          hdsk0-error regstr
- Port 1F1h          hdsk0-precomp cylr
- Port 1F2h          hdsk0-sector count
- Port 1F6h          hdsk0-siz/drv/head
- Port 1F7h          hdsk0-status reg
- Port 1F7h          hdsk0-command reg
- Port 1F7h          "al = 90h,    contrlr diagnostic"
- Port 201h          "start game    1-shots"
- Port 378h          printer-2 data
- Port 379h          printer-2 status
- Port 37Ah          printer-2 control
- Port 37Ah          "al = 0Ch,    init & strobe off"
- Port 37Ah          "al = 0Dh,    strobe on"
- Port 3B4h          MDA/EGA reg index
- Port 3B4h          "al = 0, horiz char total"
- Port 3B5h          MDA/EGA indxd data
- Port 3B8h          MDA video control
- Port 3BCh          MDA printer-1 data
- Port 3D4h          CGA/EGA reg index
- Port 3D4h          "al = 0,  horiz char total"
- Port 3D4h          "al = 0Ah,    cursor start, mode"
- Port 3D4h          "al = 0Bh,    cursor end"
- Port 3D4h          "al = 0Fh,    cursor position lo"
- Port 3D4h          "al = 10h,    light pen high"
- Port 3D4h          "al = 11h,    light pen low"
- Port 3D5h          CGA/EGA indxd data
- Port 3D8h          CGA video control
- Port 3D9h          CGA color control
- Port 3DAh          CGA/EGA vid status
- Port 3F2h          dsk0 contrl output
- Port 3F4h          dsk0 cntrlr status
- Port 3F5h          dsk0 controlr data
- Port 3F6h          "al = 4, reset controller"
- Port 3F7h          disk status
- Port 3F7h          disk0 config ctrl
- Port 3F8h          RS232-1 xmit buffr
- Port 3F9h          RS232-1 int enable
- Port 3F9h          "al = 0, all interrupts off"
- Port 3FAh          RS232-1 int identy
- Port 3FBh          RS232-1 line cntrl
- Port 3FBh          "al = 0, set DLAB off"
- Port 3FBh          "al = 80h,    set DLAB on"
- Port 3FCh          RS232-1 modem ctrl
- Port 3FCh          "al = 3, DTR and RTS on"

Figure 8B

ADVANCED FIRMWARE BOOT SEQUENCE X86 COMPUTER SYSTEM THAT MAINTAINS LEGACY HARDWARE AND SOFTWARE COMPATIBILITY

FIELD OF THE INVENTION

The field of the present invention pertains to the initialization functions and routines of x86 computer systems. More particularly, the present invention pertains to a method and a system for initializing x86 computer systems by using advanced firmware.

BACKGROUND OF THE INVENTION

The "IBM-compatible" computer system is well known and is widely used in many different areas of business, industry, government, and the home. More than 90 percent of the personal computer systems sold by the industry today are IBM-compatible. The vast majority of software programs written for personal computer systems are designed to function with the standard, IBM-compatible, x86 computer system. Each IBM-compatible computer system is substantially the same with regard to its basics functions as the original IBM PC AT (sometimes referred to as PS/2) computer system introduced in 1984.

The IBM PC AT computer (hereinafter referred to as the IBM PC) was built upon what became known as the industry standard architecture. This architecture is based upon various attributes of the IBM PC computer system. As is well known, the original IBM PC was based upon an Intel x86 microprocessor (e.g., the Intel 80286) and ran software written to the Intel x86 instruction set. The architecture of the IBM PC was comprised of various discrete hardware components (e.g., such as interrupt controller chips, input output controller chips, and the like) and basic functional software, or boot software, stored in non-volatile memory chips.

The most basic operations of the IBM PC were controlled by this basic functional software component stored in a ROM chip, referred to as basic input output system software, or "BIOS". When the computer system is initially powered on, the BIOS software is the executed from non-volatile memory and initializes the various discrete hardware components to place the computer system into a state of readiness, wherein the system is able to subsequently execute software from a coupled mass storage device (e.g., a floppy disk, a hard drive, etc.). Each of these attributes comprise portions of the IBM PC compatible architecture and define what it means to be "IBM-compatible". Software programmers and hardware device designers became intimately familiar with these attributes of the IBM PC and the IBM PC compatible architecture. There software programs and hardware devices are designed to access the innermost data structures, addresses, I/O registers, and other such attributes. Thus, these attributes have become known as, essentially, the "IBM-compatible API", since software engineers/hardware designers write their various applications/hardware devices to directly access and/or utilize these attributes.

For example, to be software compatible, a software application must be able to run on an IBM PC. The software application must be able to interface with the specific addresses of certain discrete hardware components, specific input output register addresses, specific memory locations defined by the BIOS to perform certain functions, and the like, on the IBM PC. Each of these various attributes determine whether a software program is IBM-compatible or not.

With respect to IBM-compatible computer systems, to be hardware compatible, a computer system from a different manufacturer (e.g., Compaq) must be able to successfully run software applications written specifically for the IBM PC. To be hardware compatible, a computer system must use the same specific addresses for the same specific functions, utilize the same input output registers at the same addresses, perform the same BIOS functions by accessing the identical memory locations, and the like.

Essentially, to be IBM-compatible, a manufacturer had to build its respective computer system using substantially the same hardware components and executing the same software for implementing its most basic functions, such as BIOS software, as the IBM PC. To use different hardware (e.g., interrupt controller's, memory controllers, bus interfaces, or the like), or to use different BIOS software meant risking hardware and/or software compatibility and risking the possibility of not being able to run IBM-compatible software applications or to use IBM-compatible hardware devices.

This had a practical effect of freezing the basic hardware and basic software of all IBM-compatible computer systems at the IBM PC level. To maintain compatibility with the large number of previously written software programs and previously designed hardware devices, commonly referred to as legacy programs and legacy hardware, each successive generation of computer systems remained substantially the same as the IBM PC. Thus, while the industry has progressed by several generations from the Intel 286 microprocessor used in the original IBM PC (e.g., the Pentium II, AMD K6, etc.) the most basic functionality of all IBM-compatible computer systems remains the same.

The problem with this situation is the fact that in order to remain compatible, computer manufacturers have had to retain this most basic functionality of the IBM PC, regardless of how out of date, or how unsuited to task, this basic functionality has become. Computer manufacturers have been unable to incorporate advances or improvements to this functionality without sacrificing compatibility with legacy programs and legacy hardware. As specific user applications have increased in sophistication, so to have demands for reliability, performance, and availability of the computer systems. These demands are becoming increasingly difficult to satisfy given the "primitive" state of the most basic functionality of IBM-compatible computer systems. Computer systems are now several orders of magnitude more capable and more sophisticated than the original IBM PC. However, the systems still must use the same BIOS software and boot through the same sequence of operations as the original IBM PC, or risk sacrificing compatibility with legacy programs and legacy hardware.

For example, it would be very desirable to build a modern computer system which incorporates modern firmware. Modern firmware uses up-to-date, current design practices to implement the most basic functions of a computer system. Modern firmware is designed to present very structured, standardized, APIs to applications running on the computer system. Such a modern computer system would take advantage of all the advances in computer system technology. Such a system would use state-of-the-art components and use state-of-the-art programming techniques. Such a modern computer system would provide a huge vantages in terms of its usability, its reliability, and its ability to incorporate much more modern subsystems (e.g., a modern graphics rendering pipe line, modern hardware peripheral interfaces, and the like).

The problem with this solution, however, is the fact that, as described above, the vast majority of preexisting software programs (e.g., word processors, spreadsheets, games, etc.) and hardware peripherals (e.g., software add on cards, serial port devices, parallel port devices, etc.) for personal computers are written to the specific attributes and APIs presented by IBM-compatible computer systems. In designing a computer system which boots from and operates with a modern firmware architecture, the IBM PC hardware and the associated IBM PC BIOS is abandoned. Without this "IBM-compatible API", virtually all the preexisting hardware peripherals and software applications cannot run. This is unacceptable to the average user.

One solution to this problem is software based emulation of the IBM PC. This involves translating the instructions from one format to another using a software emulation program, and executing the translated instructions on the host system, wherein the translated instructions are native instructions and execute natively. An example of such a program would be SoftWindows from Insignia, wherein the underlying hardware would be a RISC-based machine (e.g., a MIPS based computer system running Unix) and wherein SoftWindows translates instructions from an emulated application (e.g., a Windows application) into native instructions for execution on the MIPS based computer system. The problem with this solution is that it is too slow. Full software based emulation adds to much processing "overhead" to allow the emulated application to run efficiently.

Another solution would be to include hardware support for both a legacy IBM PC a new advanced firmware, wherein the computer system boots to an IBM-compatible mode when running legacy applications and boots to the advanced firmware when running applications designed to the APIs of the new firmware. The problem with this solution is that it wastes large amounts of resources with a machine having two separate and distinct personalities. It essentially combines the hardware of two computer systems, one modern and one old, into a single computer system. Such a dual personality system wastes hardware regardless of which mode it runs in.

Thus, what is needed is a system which provides the best of both worlds. What is required is a system which maintains IBM PC compatibility and yet provides the benefits of an advanced firmware architecture. What is needed is a system which is able to boot using advanced firmware architecture yet retains compatibility with legacy hardware and legacy software. What is needed is a system which provides the advances of the modern firmware designs while preserving the ability to accommodate the legacy hardware devices and run legacy software applications. The required system needs to be able to run both modern and legacy applications efficiently and quickly with a minimum amount of processing overhead. What is needed is a system which supports legacy applications/hardware without requiring the duplication of the IBM PC API hardware/BIOS. The present invention provides a novel solution to these requirements.

SUMMARY OF THE INVENTION

The present invention provides a system that maintains IBM PC compatibility and yet provides the benefits of an advanced firmware architecture. The system of the present invention is able to boot using advanced firmware architecture and yet retains compatibility with legacy hardware and legacy software. The system of the present invention provides the advances of a modern firmware architecture and the associated programming interfaces while preserving the ability to accommodate the legacy hardware devices and run legacy software applications. The present invention provides both a method and a system able to run both modern applications and legacy applications efficiently and quickly, with a minimum amount of processing overhead. In addition, of the present invention supports legacy software/hardware without requiring the duplication of the IBM PC API hardware/BIOS.

In one embodiment, the present invention is implemented as an x86 based computer system which incorporates an advanced firmware that implements a boot process for new initializing the x86 computer system without requiring the execution of a conventional x86 bios or the incorporation of bios specific IBM PC hardware. The computer system includes one or more x86 processor(s) coupled to a volatile memory (e.g., SDRAM, etc.) and a non-volatile memory (e.g., a flash memory, etc.) via one or more buses. The non-volatile memory stores the software comprising the advanced firmware of the present invention.

In this implementation, the computer system is based upon a new architecture that takes advantage of modern design techniques and design features to provide sophisticated capabilities and functions. The present invention functions in part by providing compatibility for legacy (e.g., IBM-compatible) software applications and legacy hardware devices. The advanced firmware of the present invention boots the computer system into an initial state capable of supporting both modern software applications designed to "modern" APIs provided by the advanced firmware, or legacy IBM compatible APIs in accordance with an IBM-compatible computer system.

Upon a system reset, or upon initial power up, the computer system of the present invention begins executing the instructions of the advanced firmware. These instructions cause the computer system to initialize its associated device drivers and internal hardware, thereby "booting" the computer system. The advanced firmware initializes device drivers for the computer system, thereby making available the capabilities of the coupled devices (e.g., initializing mass storage devices such as a hard drive). The advanced firmware then initializes its APIs for supporting "modern" software programs.

The advanced firmware also initializes a "virtual compatibility machine" for supporting legacy software programs and legacy hardware devices. In one implementation, the virtual compatibility machine is a software based model instantiated by the modern firmware in volatile memory. The virtual compatibility machine includes a plurality of compatibility models which function by modeling aspects of an IBM PC compatible API. The compatibility models emulate corresponding aspects of an IBM PC compatible machine which are accessed by legacy software applications or legacy hardware devices during their operation. The compatibility models provide the IBM-compatible type interfaces expected by the legacy software programs or legacy hardware devices. The virtual compatibility machine translates functions (e.g., BIOS calls, accesses, etc.) performed by legacy software programs/hardware devices with the compatibility models, into corresponding functions performed by the device drivers and hardware of the computer system.

The advanced firmware also executes a portion of a IBM compatible BIOS in order to create a memory footprint required to support certain accesses of IBM compatible software/hardware. The software/hardware interacts with this memory footprint transparently, as if interfacing with an actual IBM compatible machine. The virtual compatibility machine translates functions, calls, accesses, etc., by legacy software programs/hardware devices to the compatibility models into corresponding functions performed by the device drivers and hardware of the computer system. Together, the virtual compatibility machine and the memory footprint provide the required environment for supporting legacy software applications/hardware devices.

In so doing, the system of the present invention provides the advances of a modern firmware, its associated programming interfaces, and a new modern architecture of the computer system itself, while preserving the ability to accommodate the legacy hardware devices and run legacy software applications. Modern software programs can access the advanced capabilities of the computer system by directly accessing the APIs of the modern firmware. Legacy software programs/hardware devices are supported with a minimum of processing overhead without requiring the expensive duplication of older, outdated IBM compatible hardware and BIOS software. This makes the computer system much faster and much more reliable.

BRIEF DESCRIPTION OF THE DRAWINGS

The present invention is illustrated by way of example and not by way of limitation, in the figures of the accompanying drawings and in which like reference numerals refer to similar elements and in which:

FIG. 8A shows a first table describing the I/O port usage of a computer system in accordance with one embodiment of the present invention.

FIG. 8B shows a second table describing the I/O port usage of a computer system in accordance with one embodiment of the present invention.

DETAILED DESCRIPTION OF THE INVENTION

Figure 1:
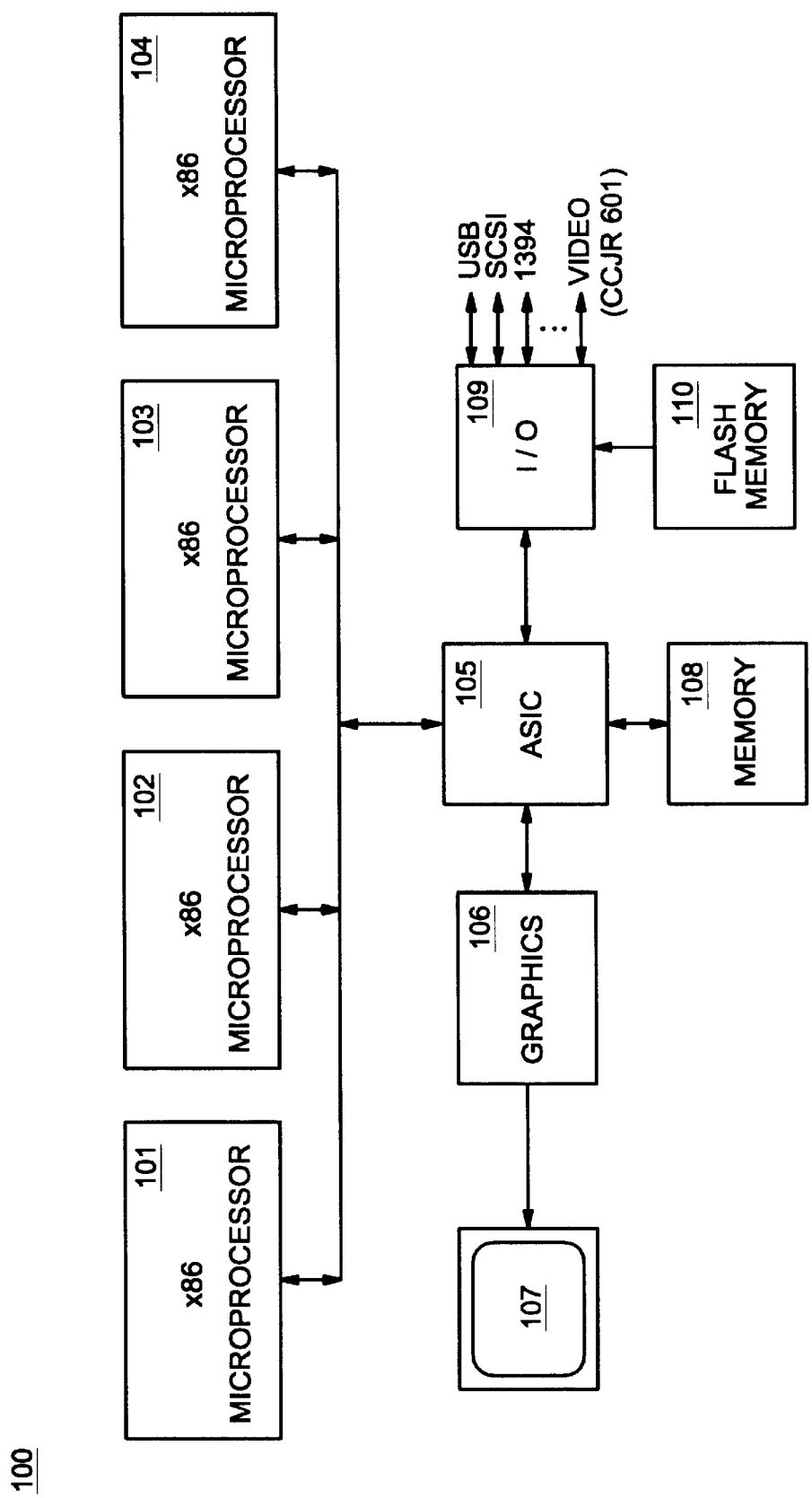
FIG. 1 shows a diagram of advanced architecture x86 computer system in accordance with the present invention.

In the following detailed description of the present invention, a method and system for efficient context switching in a computer graphics system, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer system. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical, optical, or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "transferring" or "reading" or "processing" or "executing" or "storing" or "shadowing" or "buffering" or the like, refer to the action and processes of a computer system (e.g., computer system 100 shown in FIG. 1), or similar data processing device, that manipulates and transforms data represented as physical (electronic) quantities within the computer system's registers and memories into other data similarly represented as physical quantities within the computer system memories or registers or other such information storage, transmission or display devices.

The present invention provides a system that maintains IBM PC compatibility and yet provides the benefits of an advanced firmware architecture. The system of the present invention is able to boot using advanced firmware architecture and yet retains compatibility with legacy hardware and legacy software. The system of the present invention provides the advances of a modern firmware architecture and the associated programming interfaces while preserving the ability to accommodate the legacy hardware devices and run legacy software applications. The present invention provides both a method and a system able to run both modern applications and legacy applications efficiently and quickly, with a minimum amount of processing overhead. In addition, of the present invention supports legacy software/hardware without requiring the duplication of the IBM compatible API hardware/BIOS. The present invention and its benefits are further described below.

Referring now to FIG. 1, a block diagram of an exemplary computer system 100 upon which the present invention may be practiced is shown. The computer system 100 includes one or more host processors 101–104 which are used to run software applications. The host processors 101–104 execute x86 based instructions. Some examples include the Pentium, Pentium II, K6, etc. microprocessors manufactured by companies such as Intel, Advanced Micro Devices, Integrated Device Technologies, National Semiconductor, etc. These microprocessors 101–104 process x86 applications and run DOS, Windows, Windows NT, etc. operating systems. However, unlike previous PC's, the currently preferred embodiment of the present invention does not utilize a basic input/output system (BIOS). Instead, an advanced firmware is used to boot the system upon power up or reset. The advanced firmware of the present invention is stored in a flash memory 110. Also included in flash memory 110 is the VCM and a portion of 16-bit BIOS code. The significance, functions, and mechanics associated with the firmware, VCM, and 16-bit BIOS code are each described in greater detail below.

Coupled to microprocessors 101–104 is an application specific integrated circuit chip (ASIC) 105. ASIC 105 performs most of the functions which are not handled by the host processors 101–104. For example, ASIC 105 performs the functions of a central processing unit (CPU) interface, memory controller, image processor, digital signal processor, graphics rendering engine, data compression/expansion device (JPEG and MPEG), translation hardware, buffers, FIFOs, etc. Coupled to ASIC 105 is a graphics subsystem. 105 which is used for accelerated 3-D graphics rendering. One example is the OpenGL pipeline architecture developed by Silicon Graphics Inc. Images are displayed on a CRT or flat panel display 107. In the currently preferred embodiment, a single unified memory 108 is coupled to ASIC 105. Memory 108 consists of dynamic random access memory (DRAM) which is dynamically allocated to function as a main memory, graphics (e.g., texture) memory, image processing (e.g., frame buffer memory), etc. A unified memory architecture is described in great detail in the patent application entitled, "A Unified Memory Computer Architecture With Dynamic Graphics Memory Allocation," filed Sep. 13, 1996, Ser. No. 08/713,779 and which is incorporated by reference in its entirety herein. An input/output (I/O) chip 109 is coupled to ASIC 105. I/O chip 109 provides the appropriate interface with internal and/or external devices, such as the universal serial bus (USB), small computer system interface (SCSI), IEEE 1394, video (CCJR 601), etc. With the present invention, the x86 microprocessors run CISC whereas other parts of the computer system may run RISC or other formats. For example, microprocessors 101–104 run CISC; while at the same time, ASIC 105 runs RISC. It should be noted that this block diagram is shown as an example of one of the many different types of computer architectures which the present invention now enables computer vendors to design. The present invention applies to all of the various new designs as well as to work stations, laptops, minicomputers, and even mainframes.

Figure 2:
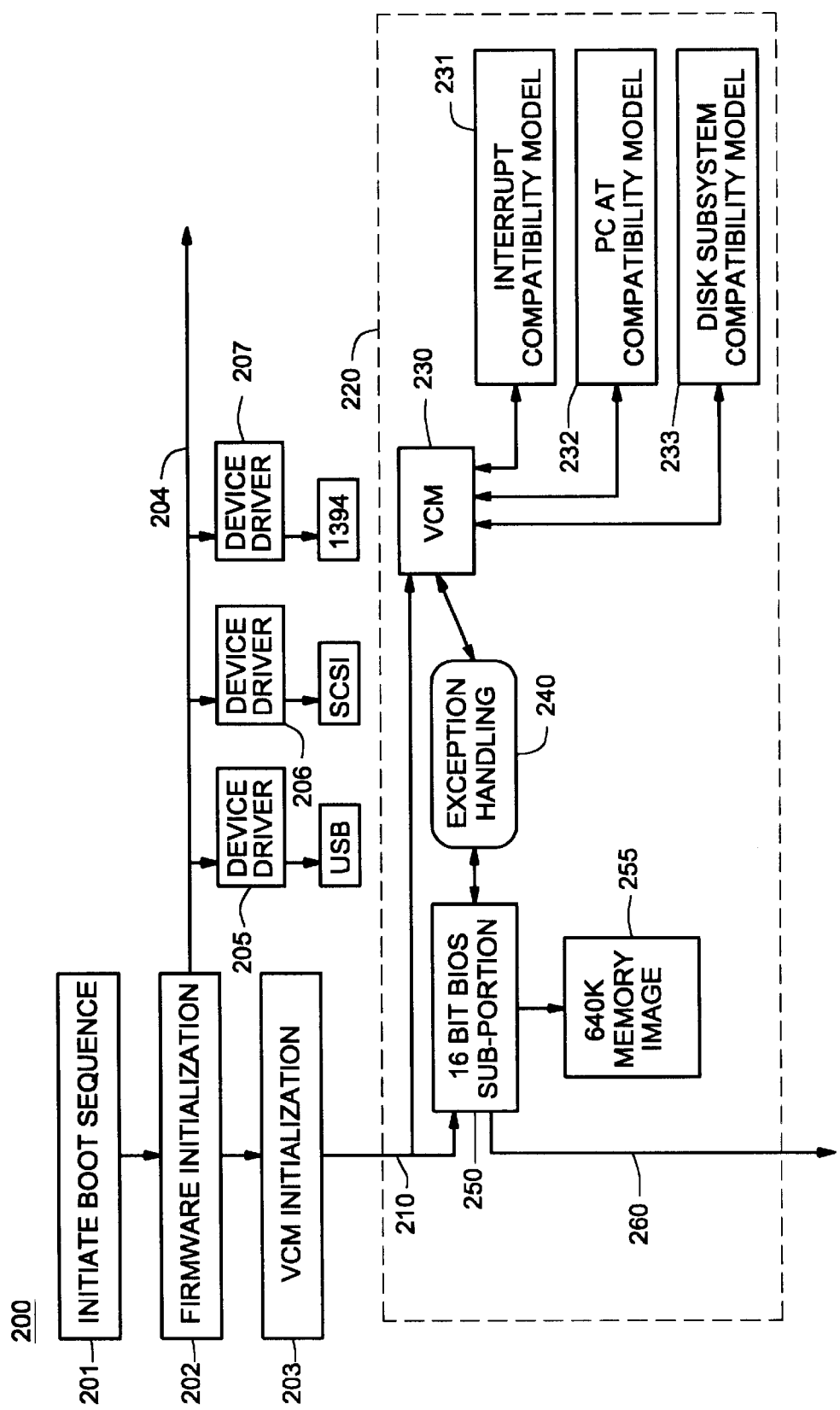
FIG. 2 shows a diagram of an advanced firmware boot sequence in accordance with one embodiment of the present invention.

With reference now to FIG. 2, a diagram 200 of an advanced firmware boot sequence in accordance with one implementation of the present invention, as implemented with computer system 100, is shown. As depicted in diagram 200, the boot sequence of the present invention begins in block 201 where a power up of the computer system (e.g., computer system 100), a "system reset" by the user, or some other event otherwise initiates the boot sequence. As is well known, upon an initial power up or system reset, computer system 100 initializes its basic functions and its basic hardware devices (e.g., USB devices, SCSI devices, 1394 devices, etc.). This is shown in block 202, where the advanced firmware of the present invention initializes device drivers 205 through 207, and any other device drivers for any other coupled devices. This is graphically depicted by line 204.

Once the device drivers of computer system 100 are initialized (e.g., device drivers 205 through 207), the advanced firmware the present invention initializes APIs for accessing the device drivers and other internal hardware of computer system 100. In accordance with the present invention, the firmware provides modern APIs using modern software design techniques for accessing devices coupled to computer system 100. The APIs presented by the firmware are standardized and documented. For example, advanced firmware compliant software applications access the coupled devices by using appropriate calls to the firmware APIs as opposed to accessing the hardware directly. Once the device drivers are initialized and their respective APIs are initialized, other software can be retrieved from mass storage devices coupled to the computer system (e.g., a SCSI hard drive) and executed to continue to boot process.

Upon completion of the initial boot sequence in block 201 and completion of firmware initialization in block 202, computer system 100 is capable of running advanced firmware compliant software applications. Device drivers for computer system 100 are initialized and their associated APIs are in place. At this point in the boot sequence, computer system 100 is capable of supporting advanced firmware compliant applications. For example, computer system 100 would be capable of supporting a UNIX-based operating system, wherein the initialization software for the operating system is fetched from the SCSI mass storage device (e.g., a SCSI hard drive) and executed, in order to, for example, further initialize memory 108 with any required data structures, and display appropriate user interface information via graphics 106. Upon completion of firmware initialization in block 202, the advanced firmware boot process the present invention next proceeds to VCM initialization in block 203.

To provide support for legacy software applications and legacy hardware applications, the advanced firmware boot sequence of the present invention proceeds to block 203 for initialization of a virtual compatibility machine. Initializing the virtual compatibility machine involves a number of steps and processes. For clarity, these steps and processes are grouped together in the region labeled 220.

In block 203, the advanced firmware the present invention initializes a virtual compatibility machine (e.g., VCM). In accordance with the present invention, the VCM functions in part by providing support for legacy software programs and legacy hardware devices. To initialize the virtual compatibility machine, the advanced firmware places computer system 100 into "virtual x86 " mode by changing modes of the one or more x86 microprocessors (e.g., microprocessors 101 through 104) from "real mode" to "virtual x86 " mode. This allows the advanced firmware to protect its software data structures and memory and designate certain memory locations as "privileged" while proceeding with the virtual compatibility machine initialization process (e.g., the steps and processes within region 220). To begin to VCM initialization process, the VCM is instantiated within memory 108 in block 230. The entry into virtual x86 mode is graphically depicted by line 210 as it crosses from block 203 and into region 220.

In accordance with the present invention, VCM 230 is a software based abstraction of certain portions of the physical hardware (e.g., memory locations, registers, etc.) of an IBM-compatible PC. In accordance with the present embodiment, the virtual compatibility machine is a software based model which abstracts the functions, features, and characteristics of certain portions of the IBM-compatible API. The virtual compatibility machine includes a series of models corresponding to the specific functional aspects of the IBM-compatible API. FIG. 2 depicts the compatibility models 231 through 233, specifically, the interrupt compatibility model 231, the PC AT compatibility model 232, and the disk subsystem compatibility model 233. These compatibility models are software based models of the IBM-compatible API. For example, interrupt compatibility model 231 is a software based emulation of the interrupt registers, I/O addresses, etc. of the interrupt hardware of the IBM-compatible API. PC AT compatibility model 232 provides a similar software based emulation of the specific memory locations and input output registers utilized for specific input output functions of the IBM-compatible API (e.g., keyboard access registers, parallel port registers, serial port registers, and the like). Similarly, disk subsystem compatibility model 233 provides a software based emulation of the specific memory locations, registers, addresses, etc., of the disk subsystem of the IBM-compatible API.

Compatibility models 231 through 233 are used by VCM 230 to keep track of the state of the "emulated IBM PC". As described above, computer system 100 does not include the hardware dictated by the IBM-compatible API. As such computer system 100 does not include the physical memory locations, registers, etc. dictated by the IBM-compatible API and expected by IBM-compatible software applications. Instead, VCM 230 in accordance with the present invention emulates these memory locations, registers, etc. by keeping track of their state as they are manipulated/accessed the IBM-compatible software applications. Thus, VCM 230 uses compatibility models 231 through 233 to maintain a state of an IBM-compatible computer system as if compatibility models 231 through 233 were real physical hardware.

In addition to initializing a VCM 230, the advanced firmware of the present invention also executes a sub-portion of a IBM-compatible 16-bit BIOS in block 250. The 16-bit BIOS sub-portion is a portion of the BIOS found in every IBM-compatible PC. The present invention executes this 16-bit BIOS sub-portion 250 in order to create an IBM-compatible 640K memory image 255. When a prior art IBM-compatible computer system executes its BIOS, the BIOS creates a "memory footprint" of specific software data structures used for specific purposes. Such purposes include for example, frame buffers, input output registers, BIOS system calls, and the like. IBM-compatible software applications and hardware devices access this memory footprint to accomplish the associated functions. Instead of recreating each of these items individually, the advanced firmware of the present invention runs the 16-bit BIOS sub-portion 250 to create the 640K memory image 255. Hence, when an IBM-compatible software application is running, it accesses the 640K memory image 255 to accomplish its desired function The advanced firmware of the present invention utilizes exception handling in order to execute the 16-bit BIOS sub-portion 250. As depicted in FIG. 2, exception handling 240 handles the exceptions generated by running the 16-bit BIOS sub-portion 250. As described above, the advanced firmware places the computer system 100 into virtual x86 mode to execute the steps in region 220. This allows the firmware to designate certain addresses in memory as privileged, thereby causing the generation of exception, or trap, when a software applications subsequently tries to access one of the privileged addresses.

In accordance with the present invention, the advanced firmware configures microprocessors 101 through 104 to recognize attempts to access IBM-compatible addresses/memory locations/registers as exceptions. Thus, the 16-bit BIOS sub-portion is executed directly by microprocessors 101 through 104. Accesses to privileged addresses generate exceptions which are handled by exception handling 240. These exceptions correspond to attempted accesses to IBM-compatible API addresses, memory locations, etc. Exception handling 240 passes these exceptions to the virtual compatibility machine 230 where they are interpreted.

VCM 230 then determines what the attempted operation was. VCM 230 interprets the exception generated by the 16-bit BIOS sub-portion 250 to determine what action the 16-bit BIOS sub-portion is attempting. Once the attempted action is determined, VCM 230 then implements the attempted action via the appropriate compatibility model 231 through 233 and returns control back to the 16-bit BIOS sub-portion 250 via the exception handler 240.

For example, in a case where the 16-bit BIOS sub-portion attempts to read from I/O register of the IBM-compatible API (e.g., the register corresponding to the keyboard controller) this attempted access generates an exception. Exception handler 240 passes the exception to the VCM 230. The VCM 230 determines that the 16-bit BIOS sub-portion was attempting to read from an I/O register of the IBM-compatible API corresponding to, for example, the keyboard controller. The VCM 230 reads the state of a variable within PC AT compatibility model 232 which represents the specific I/O register and returns this value to the 16-bit BIOS sub-portion 250. Thus, from the perspective of the 16-bit BIOS sub-portion 250, it just read the value from the real I/O register of a real IBM-compatible computer system, whereas in reality, it merely read the value of a variable in a corresponding software based compatibility model (e.g., PC AT compatibility model 232).

In a case where the 16-bit BIOS sub-portion attends to access a device (e.g., a hard disk drive), the accesses also generates an exception, is passed to the VCM 230, interpreted, and translated into a corresponding access to one of the "real" device drivers (e.g., device driver 206 for the SCSI subsystem) of computer system 100 via one of the compatibility models 231 through 233 (e.g., disk subsystem compatibility model 233).

In this manner, the 16-bit BIOS sub-portion runs natively at full speed on microprocessors 101 through 104 of computer system 100. Its execution is only interrupted when the 16 bit BIIOS sub-portion attempts to access nonexistent hardware/memory locations/addresses, as when it intends to access specific aspects of the IBM-compatible API. Such accesses generate exceptions which are handled by exception handler 240 and interpreted by the VCM 230. The accesses are translated into equivalent functions using the compatibility models 231 through 233.

Once the 16-bit BIOS sub-portion 250 finishes its execution, the 640K memory image 255 has been created and has been mapped into system memory 108. As described above, the 640K memory image 255 provides the memory footprint portion of the IBM-compatible API. The 640K memory image 255 in conjunction with the VCM 230 (and its included compatibility models 231 through 233) now provide the elements of the IBM-compatible API required to support IBM-compatible software and hardware. Once the 640K memory image 255 and the VCM 230 and its associated compatibility models 231 through 233 are properly initialized (e.g., the 16-bit BIOS sub-portion finishes execution), computer system 100 is ready to fully support legacy software applications and legacy hardware devices. Control of the computer system is then passed to the appropriate application (either legacy application or modern application). This is graphically depicted by line 260.

Subsequently, when legacy applications run (e.g., Windows 95) the legacy applications run natively at full speed on microprocessors 101 through 104. Only their accesses to privileged addresses, corresponding to specific aspects of the IBM-compatible API, are trapped and translated. Thus, the system of the present invention is much faster than any prior art, full software based emulation program.

In contrast, when modern, firmware compliant applications run, they access the functionality of computer system 100 directly via the APIs presented by advanced firmware of the present invention. They access the hardware of computer system 100 and the coupled devices by directly calling the respective APIs, completely bypassing the 640K memory image 255 and the VCM 230. Thus, when executing modern firmware compliant applications, computer system 100 is much more stable and much more reliable than an equivalent IBM-compatible computer system incorporating all of the conventional IBM-compatible API hardware and software.

Figure 3:
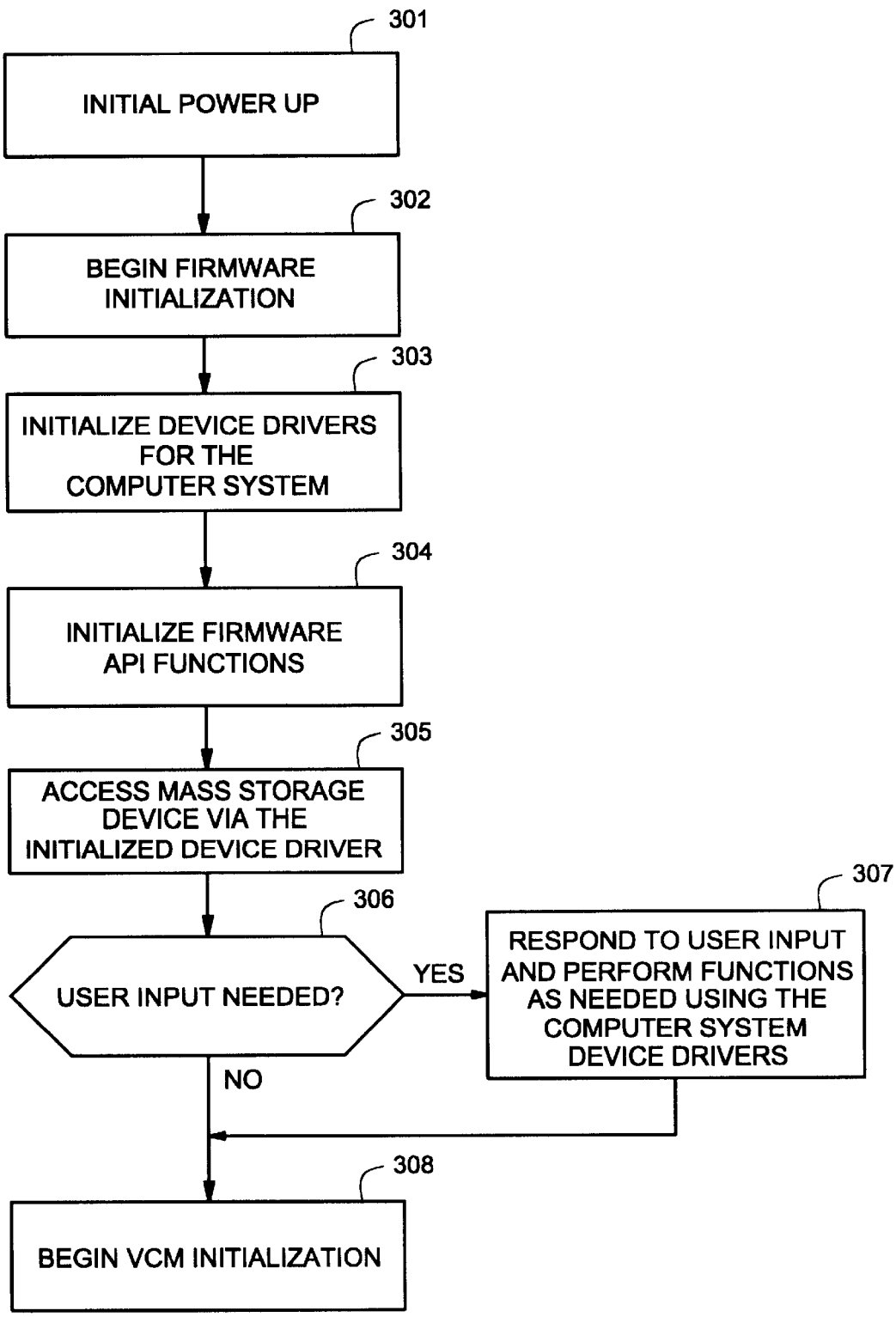
FIG. 3 shows a flow chart of the steps of the firmware initialization process of the present invention.

With reference now to FIG. 3, a flow chart of the steps of a process 300 in accordance with the present invention is shown. Process 300 shows the steps involved in performing the initiation of the boot sequence and the firmware initialization process of the present invention (e.g., blocks 201 and 202 of FIG. 2).

As depicted in FIG. 3, process 300 begins in step 301 where computer system 100 is initially powered up. Upon initial power up, computer system 100 begins fetching instructions comprising the advanced firmware from flash memory 110. These instructions begin the firmware initialization process, as shown in step 302. In step 303, the advanced firmware the present invention begins initializing the device drivers for computer system 100. As described above, the device drivers interface with their respective devices. As the device drivers are initialized, their respective devices (e.g., USB, SCSI, 1394, etc.) are made available to the computer system 100.

In step 304, the firmware the present invention initializes its API functions. As described above, the firmware presents modern standardized APIs for interfacing with the hardware and functionality of computer system 100. The hardware of computer system 100 and the coupled devices (e.g., USB, SCSI, 1394, etc.) are accessed via their respective APIs. Once the device drivers and their associated APIs are initialized, their respective devices are available to other resources of computer system 100. Thus, in step 305, the advanced firmware of the present invention is able to access a mass storage device (e.g., a coupled SCSI hard drive) via its initialized device driver and respective API, in order to, for example, fetch additional instructions.

At this point, the hardware of computer system 100 is available to the advanced firmware. Thus, the advanced firmware is able to query the user for any required input, as shown in step 306. For example, a menu choices can be displayed to the user via graphics pipeline 106 and monitor 107 (since their device drivers and associated APIs have been initialized). Similarly, user input can be accepted via a USB keyboard or USB mouse. In step 307, the advanced firmware responds to user input and performs the functions as needed using the initialized device drivers. As described above, at this point, computer system 100 is capable of supporting modern firmware compliant software applications. These applications are capable of accessing the full hardware and software functionality of computer system via the modern standardized APIs presented by the modern firmware. Subsequently, in step 308, the advanced firmware of the present invention is ready to begin VCM initialization.

Figure 4:
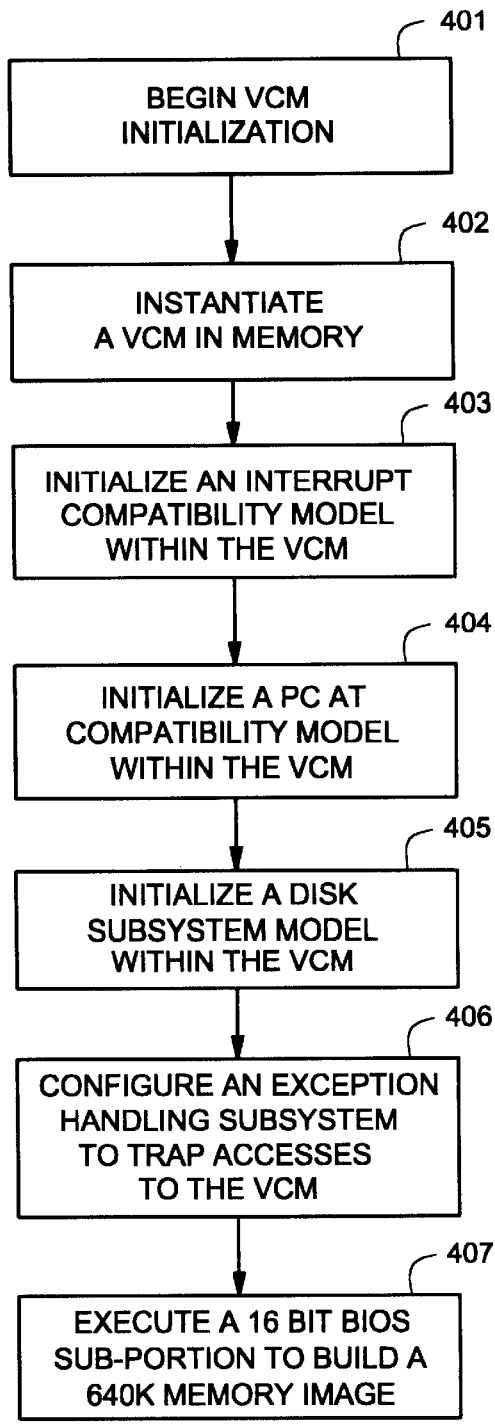
FIG. 4 shows a flow chart of the steps of the VCM initialization process in accordance with one embodiment of the present invention.

Referring now to FIG. 4, a flow chart of the steps of a process 400 in accordance with the present invention is shown. As depicted in FIG. 4, process 400 shows the steps involved in initializing the VCM of the present invention (e.g., blocks 203, 250, and 230 through 233 of FIG. 2).

As depicted in FIG. 4, process 400 begins in step 401, where VCM initialization is begun. As described above, computer system 100 is placed into virtual x86 mode, wherein memory addresses, I/O registers, etc. corresponding to the IBM-compatible API are designated as being privileged. Subsequent accesses to any of these locations, addresses, registers, etc. generate exceptions. Additionally, in step 402, the VCM is instantiated within memory 108 of computer system 100. Beginning in step 403, the compatibility models comprising the VCM are each initialized. In step 403, and interrupt compatibility model is initialized. In step 404, a PC AT compatibility model is initialized. And in step 405, a disk subsystem compatibility model is initialized. As described above, these models are software based representations of specific aspects of the IBM-compatible API. The models are used to maintain a "state" of an emulated IBM-compatible machine, wherein instead of real physical hardware, software emulated hardware is used to interact with and except input from and provide input to legacy software applications and/or hardware.

In step 406, the exception handling subsystem (e.g., block 240 of FIG. 2) of computer system 100 is configured to trap accesses to the memory locations, addresses, registers, etc., corresponding to certain specific aspects of the IBM-compatible API. Once the exception handling subsystem is configured, legacy software applications can execute natively on processors 101 through 104 at full speed. Any accesses to non-existent IBM-compatible hardware, memory, registers, etc., are trapped to the VCM as described above. Subsequently, in step 407, the advanced firmware of the present invention executes a 16-bit BIOS sub-portion to build a 640K memory image. As described above, upon completion of the 16-bit BIOS sub-portion execution, the 640K memory image will correspond to the memory image of an IBM-compatible computer system, and will thus be able to support legacy software applications/hardware.

Figure 5:
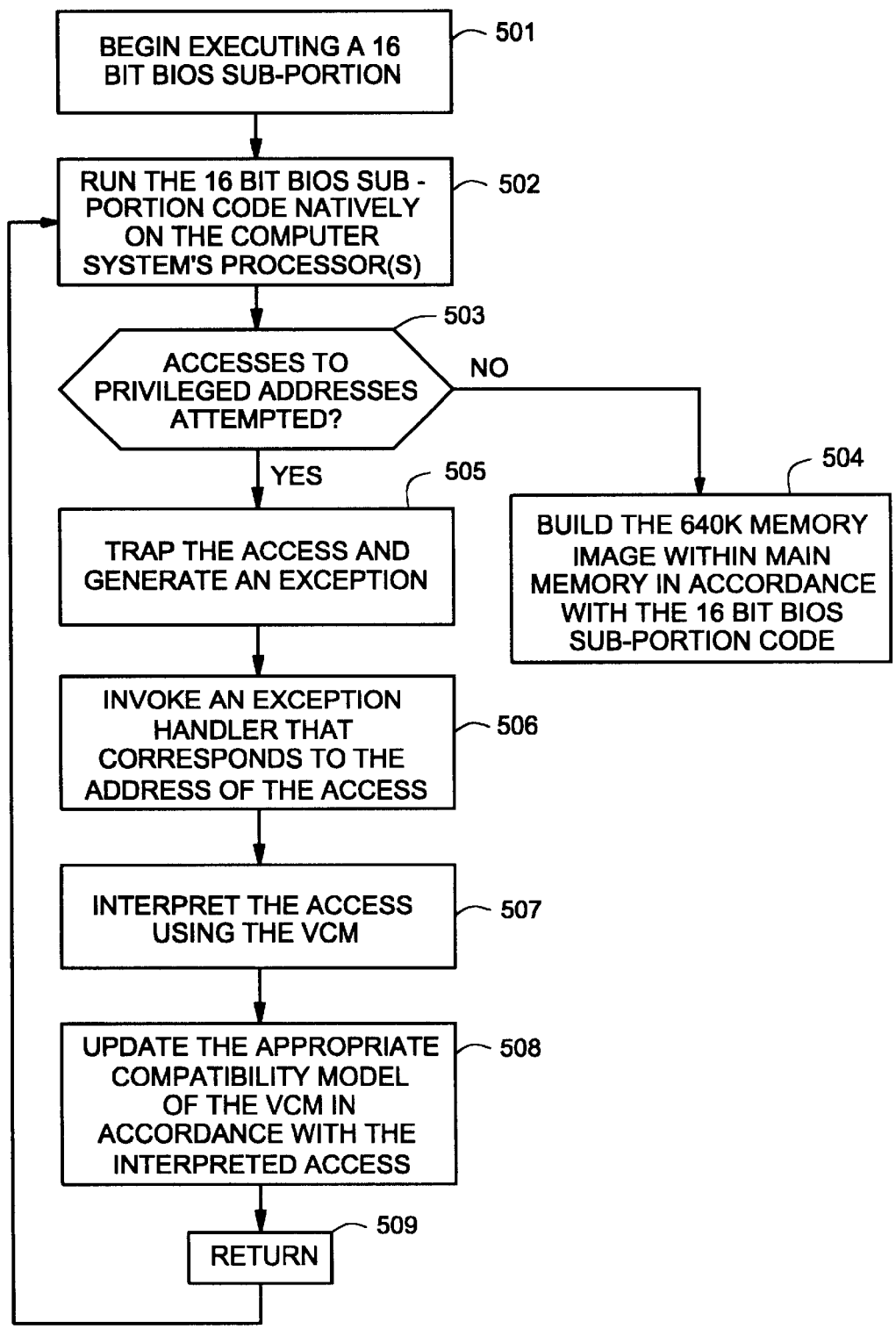
FIG. 5 shows a flow chart of the steps of a process of executing the 16-bit bios sub-portion and handling exceptions generated therefrom in accordance with the present invention.

FIG. 5 shows steps involved in a process 500 of executing the 16-bit BIOS sub-portion and building the 640K memory image. Steps 501 to 509 a process 500 implement blocks 250, 255, 240, and 230 through 233 of FIG. 2.

Process 500 begins in step 501, where execution of the 16-bit BIOS sub-portion is begun. In step 502, as described above, the instructions of the 16-bit BIOS sub-portion are executed natively on computer system 100 sub processors 101 through 104. As discussed in process 400 of FIG. 4, the exception handling subsystem of computer system 100 is configured to trap accesses to IBM-compatible API addresses. Thus, the 16-bit BIOS sub-portion runs natively, and continues to do so until in exception is generated. When the 16-bit BIOS sub-portion attempts to access privileged addresses, in step 503, the relevant access is trapped and an exception is generated in step 505. In step 506, as described above, an exception handler (e.g., exception handling block 240 from FIG. 2) is invoked.

In one embodiment, the particular exception handler called depends upon the particular address of the access. In step 507, the exception is passed to the VCM for interpretation. The VCM decodes the access to determine what function the 16-bit BIOS sub-portion was attempting to perform. Then, in step 508, the VCM updates the appropriate compatibility model in accordance with its interpretation of the access. As described above, the VCM updates the state of the corresponding compatibility model to reflect the access by the 16-bit BIOS sub-portion. Once the state is updated, execution control is passed back to the 16-bit BIOS sub-portion in block 509, and the 16-bit BIOS sub-portion continues to run natively.

In this manner, the 16-bit BIOS sub-portion continues to run and continues to build the 640K memory image within main memory 108 of computer system 100, as indicated by step 504. The 640K memory image (e.g., block 255 of FIG. 2) corresponds to the memory footprint of an IBM-compatible computer system that results from it running its IBM PC AT BIOS. As such, the 640K memory image provides the needed support for running legacy software applications/hardware devices.

Figure 6:
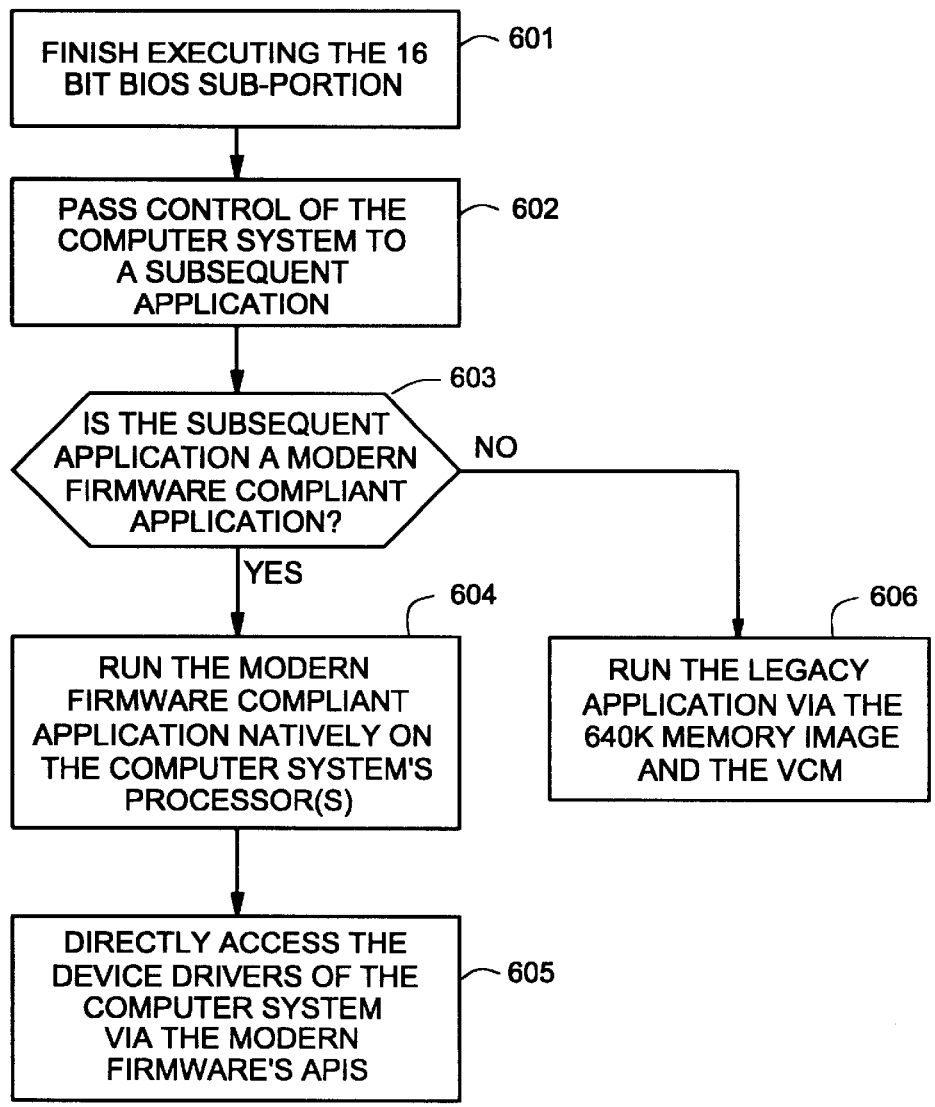
FIG. 6 shows a flow chart of the steps of the process of finishing the creation of a 640K memory image and passing controlled with subsequent application in accordance with the present invention.

Referring now to FIG. 6, the steps of a process 600 of completing the boot process of computer system 100 in accordance with the present invention is shown. As depicted in FIG. 6, process 600 shows the steps involved in finishing the execution of the 16-bit BIOS sub-portion (e.g., completing the 640K memory image) and finishing the boot process by placing computer system 100 in readiness to run either modern firmware compliant applications or IBM-compatible, legacy, applications. Particularly, steps 601 through 605 depict the steps involved in finishing the execution of the 16-bit BIOS sub-portion (e.g., block 250 of FIG. 2) and passing control of the computer system to a subsequent software application (e.g., line 260 of FIG. 2).

Process 600 begins in step 601, where the execution the 16-bit BIOS sub-portion is finished. Subsequently, in step 602, control of computer system 100 is passed to a subsequent application. In step 603, where the subsequent application is a modern firmware compliant application (e.g., designed to take advantage of the APIs presented by the modern firmware), process 600 proceeds to step 604, where the modern firmware compliant application runs natively on the computer system's processors. In step 605, the modern firmware application directly accesses the device drivers of the computer system via the modern firmware's APIs. The modern firmware application enjoys access to the hardware functionality and device functionality of computer system 100 via the APIs presented by the modern firmware. In step 603, where the subsequent application is an IBM-compatible legacy application, the application is run natively on the processors of computer system 100. As described above, accesses to certain portions of the IBM-compatible API generate exceptions which are passed to the virtual compatibility machine for interpretation and translation. The accesses are translated into equivalent accesses on the device drivers of computer system 100 via the appropriate compatibility model.

Thus, the present invention provides a system that maintains IBM PC compatibility and yet provides the benefits of an advanced firmware architecture. The system of the present invention is able to boot using advanced firmware architecture and yet retains compatibility with legacy hardware and legacy software. The system of the present invention provides the advances of a modern firmware architecture and the associated programming interfaces while preserving the ability to accommodate the legacy hardware devices and run legacy software applications. The present invention provides both a method and a system able to run both modern applications and legacy applications efficiently and quickly, with a minimum amount of processing overhead. In addition, of the present invention supports legacy software/hardware without requiring the duplication of the IBM-compatible API hardware/BIOS.

Figure 7A:
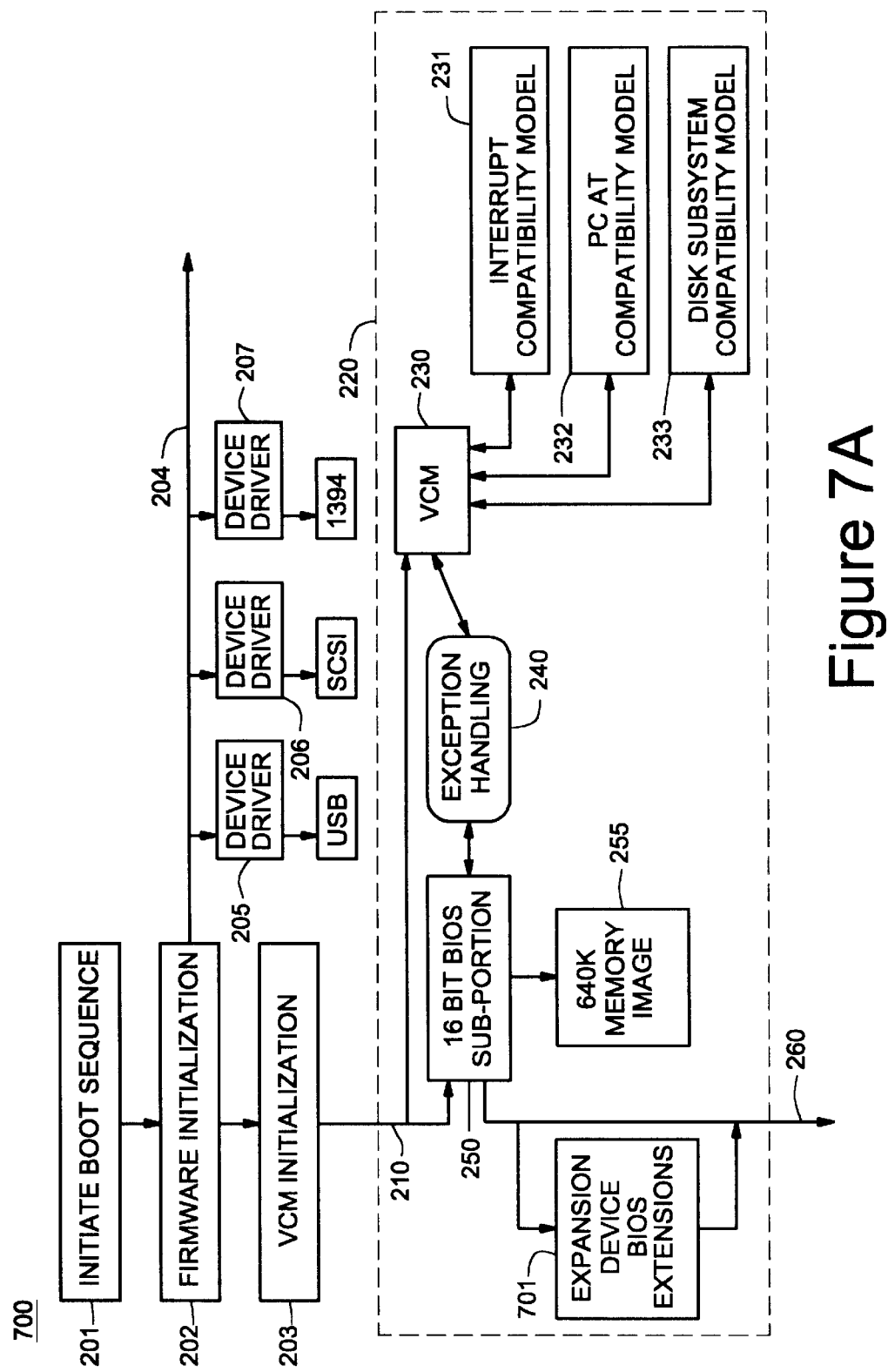
FIG. 7 shows a table describing the interrupt usage of a computer system in accordance with one embodiment of the present invention.

Referring now to FIG. 7 and FIGS. 8A and 8B, FIG. 7 shows a table 700 depicting a plurality of interrupts used in a computer system in accordance with the present invention (e.g., computer system 100) and a brief description of their usage. FIG. 8A and FIG. 8B show a table 801 and 802 which depict a plurality of I/O ports used in a computer system in accordance with the present invention (e.g., computer system 100) and a brief description of their usage. Specifically, table 801 of FIG. 8A shows I/O ports "0" through "81h" while table 802 of FIG. 8B shows I/O ports "0A0h" through "3FCh".

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An x86 based computer system that implements a firmware based boot process without an x86 BIOS, prior to initializing expansion devices of the computer system, comprising:

a computer system including an x86 processor coupled to a volatile memory and a non-volatile memory via a bus, the non-volatile memory including firmware which when executed by the processor cause the computer system to implement the steps of:

a) initializing device drivers for the computer system using the firmware;

b) initializing an application programming interface for the device drivers by using the firmware; and c) initializing a compatibility component for interfacing with the device drivers, wherein the compatibility component is operable for translating accesses by a first software application to an x86 BIOS into corresponding accesses to the device drivers, such that the first software application is able to execute on the computer system by using the compatibility component while a second software application is able to execute on the computer system by accessing the application programming interface directly.

2. The system of claim 1, wherein the first software application is a legacy application adapted to execute on an x86 BIOS based computer system.

3. The system of claim 1, wherein the firmware causes the computer system to further implement the step of running a portion of an x86 BIOS to initialize an area in volatile memory, wherein the area is configured by the portion to interface with the first software application to enable it to execute.

4. The system of claim 3, wherein the area in volatile memory corresponds to a 640K memory configuration created in an x86 BIOS based computer system when the x86 BIOS based computer system is booted.

5. The system of claim 1, wherein the firmware causes the computer system to further implement the step of initializing an exception handler to generate exceptions when the first software program accesses the x86 BIOS.

6. The system of claim 1, wherein the majority of the software code comprising the first software application executes natively on the computer system without translation.

7. A unified memory architecture x86 based computer system that implements a firmware based boot process without an x86 BIOS, prior to initializing expansion devices of the computer system comprising:

a computer system including an x86 processor coupled to a volatile memory and a non-volatile memory via a bus, the non-volatile memory including firmware which when executed by the processor cause the computer system to implement the steps of:

a) initializing software drivers for hardware of the computer system;

b) initializing an application programming interface for the hardware of the computer system;

c) running a portion of an x86 BIOS to initialize a memory area in volatile memory, wherein the area is configured by the portion to interface with a first software application to enable the first software application to execute; and c) initializing a compatibility component for interfacing with the hardware, wherein the compatibility component is operable for translating accesses by the first software application to an x86 BIOS into corresponding accesses to the hardware, such that the first software application is able to execute on the computer system by using the compatibility component and the memory area while a second software application is able to execute on the computer system by accessing the application programming interface directly.

8. The system of claim 7, wherein the first software application is a legacy application adapted to execute on an x86 BIOS based computer system.

9. The system of claim 7, wherein the area in volatile memory corresponds to a 640K memory configuration created in an x86 BIOS based computer system when the x86 BIOS based computer system is booted.

10. The system of claim 7, wherein the firmware causes the computer system to further implement the step of initializing an exception handler to generate exceptions when the first software program accesses the x86 BIOS.

11. The system of claim 10, wherein the exception handler is initialized by configuring a translation look aside buffer of the processor to generate exceptions when addresses corresponding to the x86 BIOS are accessed.

12. The system of claim 7, wherein a majority of the software code comprising the first software application executes natively on the computer system without translation.

13. In a computer system including an x86 processor coupled to a volatile memory and a non-volatile memory via a bus, the non-volatile memory including firmware which when executed by the processor cause the computer system to implement a firmware based boot process, prior to initializing expansion devices of the computer system, wherein the computer system does not boot from an x86 BIOS, the process comprising the steps of:

a) initializing software drivers for hardware of the computer system;

b) initializing an application programming interface for the hardware of the computer system;

c) initializing a compatibility component for interfacing with the hardware, wherein the compatibility component is operable for translating accesses by a first software application to an x86 BIOS into corresponding accesses to the hardware, such that the first software application is able to execute on the computer system by using the compatibility component while a second software application is able to execute on the computer system by accessing the application programming interface directly.

14. The process of claim 13, wherein the first software application is a legacy application adapted to execute on an x86 BIOS based computer system.

15. The process of claim 13, wherein the firmware causes the computer system to further implement the step of running a portion of an x86 BIOS to initialize an area in volatile memory, wherein the area is configured by the portion to interface with the first software application to enable it to execute.

16. The process of claim 15, wherein the area in volatile memory corresponds to a 640K memory configuration created in an x86 BIOS based computer system when the x86 BIOS based computer system is booted.

17. The process of claim 13, wherein the firmware causes the computer system to further implement the step of initializing an exception handler to generate exceptions when the first software program accesses the x86 BIOS.

18. The process of claim 13, wherein the majority of the software code comprising the first software application executes natively on the computer system without translation.

* * * * *